(12) United States Patent
Bernard et al.

(10) Patent No.: US 7,297,270 B2
(45) Date of Patent: Nov. 20, 2007

(54) HOLLOW FIBER FILTER FOR EXTRACORPOREAL BLOOD CIRCUIT

(75) Inventors: Steven Bernard, Andover, MN (US); Kelley Stickan, Hugo, MN (US)

(73) Assignee: CHF Solutions, Inc., Brooklyn Park, MN (US)

( * ) Notice: Subject to any disclaimer, the term of this patent is extended or adjusted under 35 U.S.C. 154(b) by 338 days.

(21) Appl. No.: 10/748,135

(22) Filed: Dec. 31, 2003

(65) Prior Publication Data

US 2004/0195165 A1    Oct. 7, 2004

Related U.S. Application Data

(60) Provisional application No. 60/459,967, filed on Apr. 4, 2003.

(51) Int. Cl.
*B01D 63/02* (2006.01)

(52) U.S. Cl. .................... 210/321.89; 210/321.79; 210/321.8; 210/321.88; 210/500.23

(58) Field of Classification Search ............ 210/321.6, 210/321.61, 321.78, 321.79, 321.8, 321.87, 210/321.88, 321.89, 500.23
See application file for complete search history.

(56) References Cited

U.S. PATENT DOCUMENTS

| | | | |
|---|---|---|---|
| 4,334,993 A * | 6/1982 | Norton | 210/321.8 |
| 4,414,110 A * | 11/1983 | Geel et al. | 210/321.8 |
| 4,784,768 A | 11/1988 | Mathieu | |
| 4,990,251 A * | 2/1991 | Spranger et al. | 210/321.8 |
| 5,072,498 A * | 12/1991 | Raff et al. | 29/896.62 |
| 5,366,630 A | 11/1994 | Chevallet | |
| 5,730,712 A | 3/1998 | Falkvall et al. | |
| 6,387,324 B1 * | 5/2002 | Patterson et al. | 422/45 |
| 2001/0016699 A1 | 8/2001 | Burbank et al. | |
| 2001/0021817 A1 | 9/2001 | Brugger et al. | |
| 2001/0037079 A1 | 11/2001 | Burbank et al. | |
| 2001/0041892 A1 | 11/2001 | Burbank et al. | |
| 2002/0103453 A1 | 8/2002 | Burbank et al. | |
| 2002/0147423 A1 | 10/2002 | Burbank et al. | |
| 2003/0009123 A1 | 1/2003 | Brugger et al. | |
| 2003/0010718 A1 * | 1/2003 | Burbank et al. | 210/651 |
| 2003/0029785 A1 * | 2/2003 | Dannenmaier | 210/263 |
| 2003/0097087 A1 | 5/2003 | Gura | |

FOREIGN PATENT DOCUMENTS

EP    0 274 178    7/1988

(Continued)

OTHER PUBLICATIONS

Declaration of Mark Gelfand (six pages) with attachments identified on the declaration.

(Continued)

*Primary Examiner*—John Kim
(74) *Attorney, Agent, or Firm*—Nixon & Vanderhye, P.C.

(57) ABSTRACT

A filter for an extracorporeal blood circuit including a bundle of hollow fibers having an end section encased in a potting material, wherein the end section of potting material has an end surface with open ends of the fibers distributed throughout the end surface, and a filter header cap having an inlet connectable to a blood line and an open end sealed around a side surface of the end section of the bundle of hollow fibers.

13 Claims, 8 Drawing Sheets

FOREIGN PATENT DOCUMENTS

| | | |
|---|---|---|
| EP | 0 990 444 A2 | 4/2000 |
| GB | 1 583 023 | 1/1981 |

OTHER PUBLICATIONS

International Search Report dated Sep. 11, 2002, PCT/US01/16720.

Jonathan D. Sackner-Bernstein, MD et al., "How Should Diuretic-Refractory, Volume-Overloaded Heart Failure Patients Be Managed?" The Journal of Invasive Cardiology, vol. 15, No. 10 (Oct. 2003), pp. 585-590.

Brian E. Jaski, MD et al., "Peripherally Inserted Veno-Venous Ultrafiltration for Rapid Treatment of Volume Overloaded Patients", Journal of Cardiac Failure, vol. 9, No. 3, (Jun. 2003), pp. 227-231.

Blood Filter Having O-Ring Face Seal (Medica Nf-00-032)(Photos Attached)(Prior Art).

Blood Filter Having Cap To Case Side Seal (0.05 Micron 106161-091) (Photos Attached)(Prior Art).

Blood Filter Having Cap To Case Side Seal (Gambro Fh 22 H Fiber Hemofilter) (Photos Attached)(Prior Art).

Blood Filter Having Cap Face Seal With Tooth (Photos Attached)(Prior Art).

Blood Filter With Cap And O-Ring Seal To Filter (Photos Attached)(Prior Art).

* cited by examiner

HOLLOW FIBER FILTER FOR EXTRACORPOREAL BLOOD CIRCUIT

RELATED APPLICATION

This invention relates to and claims priority to U.S. Provisional Application 60/459,967, filed Apr. 4, 2003.

FIELD OF INVENTION

This invention relates to a method and apparatus for a hollow fiber filter used in the treatment of extracorporeal blood, such as in renal replacement therapies. In particular, the invention relates to a header cap for a filter header housing a bundle of hollow fibers having minimized blood residence time in the header, minimum blood contact with header cap surfaces, and a smooth blood flow profile through the header.

BACKGROUND OF THE INVENTION

1. Renal Replacement and Fluid Overload Therapies

The term "Renal Replacement Therapy" (RRT) generally refers to all forms of dialysis, solute and fluid balancing therapy. Renal replacement therapy performs two primary functions: ultrafiltration (removal of water from blood plasma), and solute clearance (removal of different molecular weight solid substances from blood plasma). The filter, also called hemofilter or "dialyzer", used in RRT may perform either or both of these functions simultaneously, with or without fluid replacement. Various modes of renal replacement therapy relate to whether fluids, solutes or both are removed by the filter and whether fluids are replaced into the filtered blood. "Clearance" describes the removal of substances, both normal and waste products, from the blood whether by normal kidney function or during renal replacement therapy.

Fluid overload therapy relates to removal of excess fluids from extracorporeal blood in patients that, for example, suffer from congestive heart failure (CHF). Patients suffering from CHF have weakened hearts that are unable to provide normal blood flow to the kidney and organs of the body. CHF patients may have normal kidneys, but lack sufficient blood flow to maintain proper kidney functions of removing excess fluid, e.g., water, from the body. The build-up of excessive fluids due to inadequate kidney functions further increases the blood pumping load on the heart, which is already suffering from CHF.

Dialysis is the diffusive transfer of small solutes out of a blood plasma compartment by diffusion across a membrane of a filter. Diffusion of the solutes occurs due to a concentration gradient across the filter membrane. Diffusion occurs from the filter compartment with higher concentration (typically the blood compartment) to the filter compartment with lower concentration (typically the dialysate compartment). Since the concentration of solutes in the plasma decreases, clearance is obtained, but fluid may not be removed. Ultrafiltration can be combined with dialysis.

Hemofiltration is the combination of ultrafiltration and fluid replacement, typically in much larger volumes than needed for fluid control. The replacement fluid contains electrolytes, but not other small molecules. Since the net effect of replacing fluid without small solutes and ultrafiltration of fluid with small solutes results in net removal of small solutes, clearance is obtained.

Ultrafiltration and hemofiltration operate primarily by convection of solutes through the filter membrane. In hemofiltration, a solute molecule is swept through a filter membrane by a moving stream of ultrafiltrate. Proteins and blood cells are retained in the blood by the membrane. In patients with renal failure, renal replacement therapy, such as hemofiltration or dialysis, removes undesired solutes from their blood. In renal replacement therapy, vital elements such as electrolytes are also removed from the blood and need to be replaced to maintain electrolyte balance. Thus, hemofiltration and dialysis treatments usually require fluid replacement. In contrast, ultrafiltration does not remove substantial amounts of electrolytes and solutes.

Hemodialysis requires a large filter membrane surface to enable effective solute clearance by diffusion. Hemofiltration requires large amounts of ultrafiltrate to be transferred across the membrane to remove a relatively small amount of solute. Large amounts of fluid such as 1 to 4 liters per hour (L/hour) are continuously being removed during continuous veno-venous hemofiltration (CVVH). The resulting loss of water and electrolytes are immediately dangerous to the patient. To maintain fluid and electrolyte balance, an equally large or slightly lower amount of replacement fluid is infused into the patient. Replacement fluid is thus added into the extracorporeal blood circuit before or after the filter.

Ultrafiltration utilizes extracorporeal blood filters to remove fluids from blood, where the filter generally includes a blood passage having input and output ports, a filtered fluid discharge port and a finely porous membrane separating the blood passage and the ultrafiltrate of filtrate discharge port. The ultrafiltrate output from the filter is substantially all fluids, e.g., water, and is relatively free of solutes.

Different modalities of Continuous Renal Replacement Therapy (CRRT) have been used to treat patients suffering from excess fluid overload and acute renal failure. In the acute condition, CRRT has been performed using standard methods of hemodialysis and continuous arterio-venous hemofiltration (CAVH). More recently, CVVH has been used to reduce the complications associated with such issues as hemodynamic instability and need for arterial access.

2. Limitations of Existing Blood Devices

Extracorporeal blood treatment usually requires anticoagulation of blood to avoid blood clots forming the in blood circuit. Blood coagulation is typically activated by shear and by the contact of blood to the artificial surface of the extracorporeal circuit. Blood does not clot until several minutes after the activation of the clotting system. Reducing the residence time of blood in a blood circuit can allow the blood to flow through the circuit and back into the blood stream of the patient before a clot forms. Once the blood is returned to the natural circulatory system of the patient, the blood clotting activation process stops. Accordingly, delays in the movement of blood through the extracorporeal blood circuit may allow the clotting activation process sufficient time within which to form a clot.

FIGS. 10, 11, 12 and 13 are enlarged cross-sectional views of conventional filter headers 511, 512 and 513 such as sold under the trade names Gambro FH22H™, Cobe M60™ and Fresenius F80™. The filter header cap 512 (See, e.g., U.S. Pat. No. 4,990,251) has a separate polymer seal ring 532 forming a face seal between the rim 531 of the potting compound and the filter header cap 533. The rim is an annular ring of potting compound that is devoid of hollow fiber filters and is impervious to blood. Blood that flows to the gap between the rim 531 and cap 533 eddies just inside the circumference of the seal ring 532 and tends to clot at the seal ring. A conventional filter header cap 511 such as the Cobe M60™ has a sealing tooth 530 instead of the sealing ring of the header cap 512.

Figure 11:
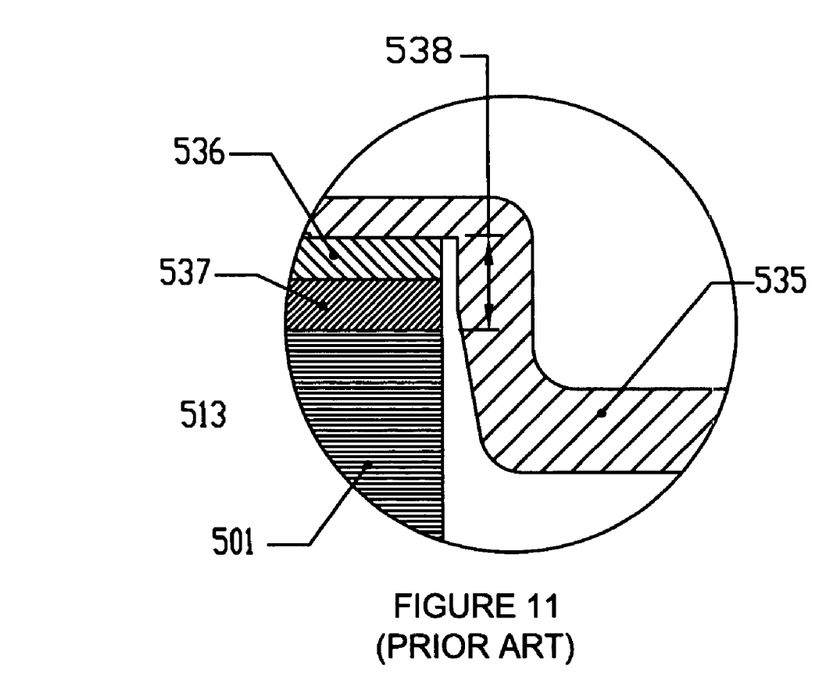
Figure 12:
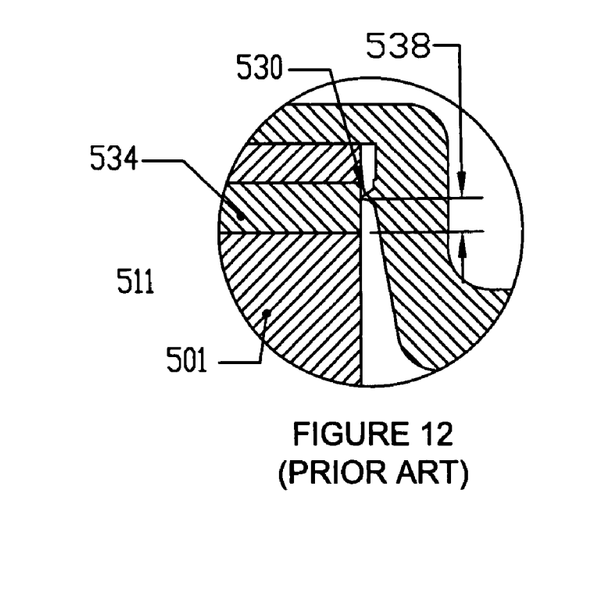
Figure 13:
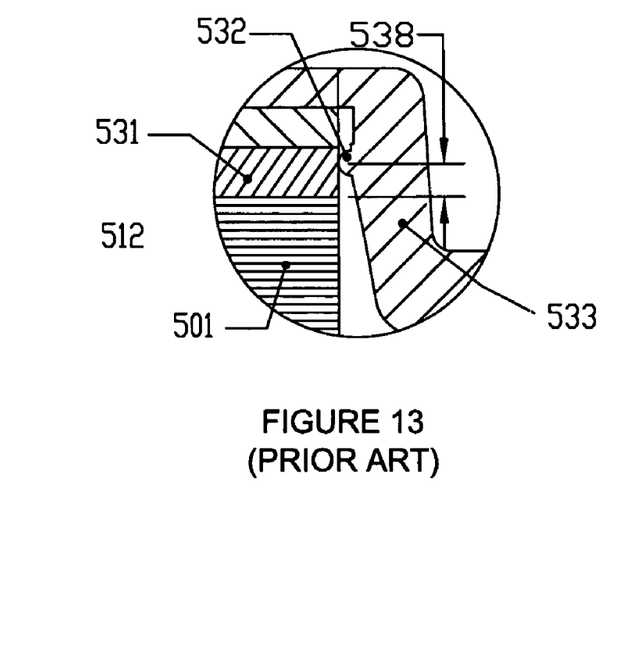

Sealing rings and teeth are not employed in some conventional filter headers 513, e.g., the Gambro FH22H™. The filter header cap 513 has a filter header cap 535 that is welded or bonded to the outer perimeter of the cylindrical filter case 536. As is shown in FIG. 11, which is an enlargement of the region 11 in FIG. 10, a wide annular dead zone 538 exists between the cap and the rim formed by the end of the filter case 536 and the rim of impervious potting compound 537. Blood clots tend to form in dead zones. The conventional filter headers shown in FIGS. 10 to 13 each have significant dead zone areas 538, which typically have a width of 2.54 mm to 5.08 mm (0.10 to 0.20 inches). These dead zones result in the stagnation of blood and promote the formation of blood clots.

Figure 14:
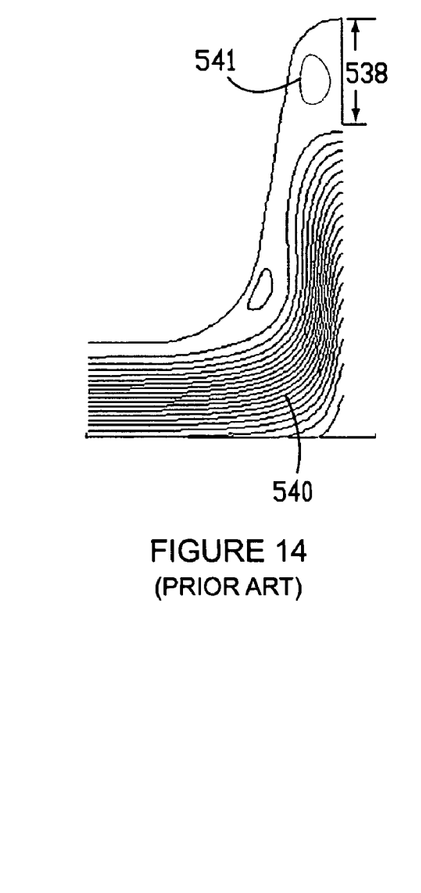
FIG. 14 is a side view of a conventional filter header showing simulations of blood flow stream lines through the header.

FIG. 14 is a graph of simulated streamlines of the blood flow through a conventional filter header cap have a wide dead zone 538. The streamlines were generated by Computational Fluid Dynamics that predict the flow streamlines within various filter cap flow paths. Smooth stream lines of blood 540 show the blood passing through the filter header cap and into the open hollow fibers of the filter. Smooth stream lines suggest the absence of dead zones, flow eddies and recirculation. However, the dead zones 538 at the potting compound rims result in recirculation areas 541 (FIG. 14) of the blood flow.

Delays in the blood circuit occur if the fluid path contains poorly perfused dead zones where blood stagnates for a long period, such as in eddy pools and at flow blockages that force the blood to recirculate through a portion of the passage. A common location for dead zones is in the entrance header cap of a filter, where the blood flows from narrow blood tubes towards the relatively wide entrance of a fiber bundle. The fiber bundles are typically encircled by annular rims of potting compound. These impervious rims are at the outer periphery of the header cap and at the side-wall of the filter housing. These rims form dead zones in the blood flow. The rims block the flow of blood and cause the blood to stagnate and recirculate in eddy currents in the filter header cap. Blood clots tend to form in the dead zones. The clots eventually will block the filter and entire circuit.

SUMMARY OF THE INVENTION

A hollow fiber filter has been developed that has a filter header with an optimized streamlined blood passage that is substantially free of obstructions and dead zones.

In a first embodiment the invention is a filter for an extracorporeal blood circuit comprising: a bundle of hollow fibers having an end section encased in a potting material, wherein said end section of potting material has an end surface with open ends of the fibers distributed throughout the end surface, and a filter header having an inlet connectable to a blood line and an open end sealed around a side surface of the end section of the bundle of hollow fibers.

In a second embodiment the invention is a filter for an extracorporeal blood circuit comprising: a bundle of hollow fibers having an end section encased in a potting material, wherein said end section has a stem of fibers and potting material upstanding from a disk of the potting material and the stem has an end surface with open ends of the fibers distributed throughout the end surface including open ends proximate to a perimeter of the end surface, a housing through which extends said bundle; a filter cap at an end of said housing, wherein the disk of the potting material is sealed to the cap, and a filter header having an inlet connectable to a blood line and an open end sealed around a side surface of the stem.

SUMMARY OF THE DRAWINGS

A preferred embodiment of the invention and limitations of current designs are illustrated in the attached drawings.

FIGS. 5 and 6 are enlarged cross-sectional views of a portion of the filter near the filter header. FIG. 6 is an enlargement of region 6 marked in FIG. 5.

DETAILED DESCRIPTION OF THE INVENTION

The outer periphery of the end of the fiber bundle extends to or near the side-wall of the filter housing. Blood at the sidewall of the filter header may flow into the open ends of fibers that are positioned next to that sidewall. Thus, a dead zone does not form next to the sidewall of the filter header. The disclosed fiber bundle minimizes dead zone by minimizing the solid potting compound rim that is at the outer edge of the potted filter area. The interior geometry of the filter header reduces dead zones at the entrance to the bundle of hollow fibers in the filter and thereby minimizes flow eddies and recirculation zones in the blood path of the header. The blood flow transitions from a blood conduit tube having a 3.2 mm internal diameter to a stem of the fiber bundle having a diameter of 11.43 mm at its end surface 505. Thus, the stem diameter is only about 3.6 times (and less than four times) the tube internal diameter. The transition in the header from the small diameter tube to the large diameter fiber bundle is prone to flow eddies, and blood recirculation that creates dead zones. The filter header minimizes blood flow eddies and recirculation dead zones by a novel filter header geometry and height between the potted filter bundle and header inlet port to streamline the blood flow through the header.

Figure 1:
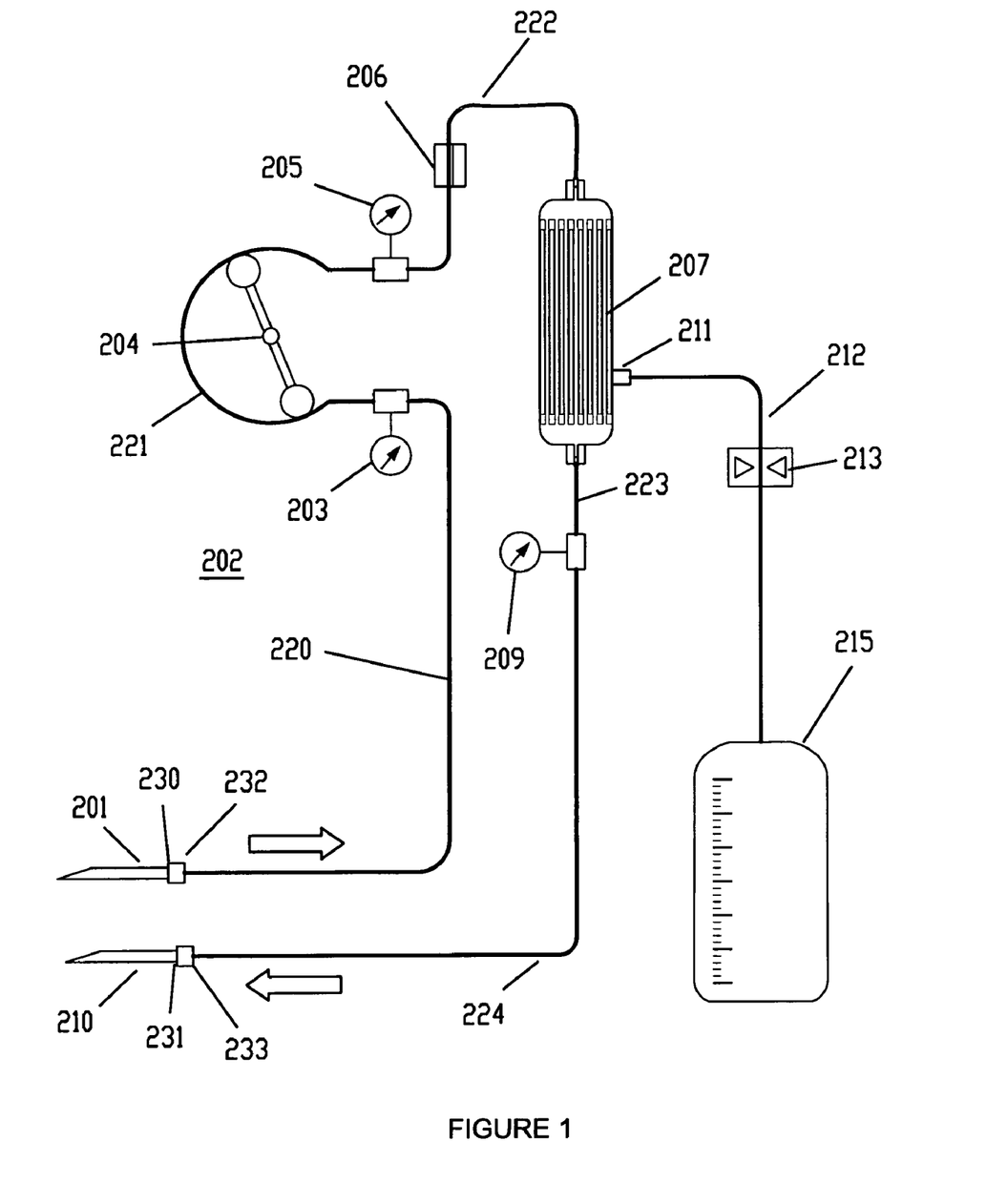
FIG. 1 illustrates an embodiment of an extracorporeal circuit having a blood filter.
Figures 2, 3:
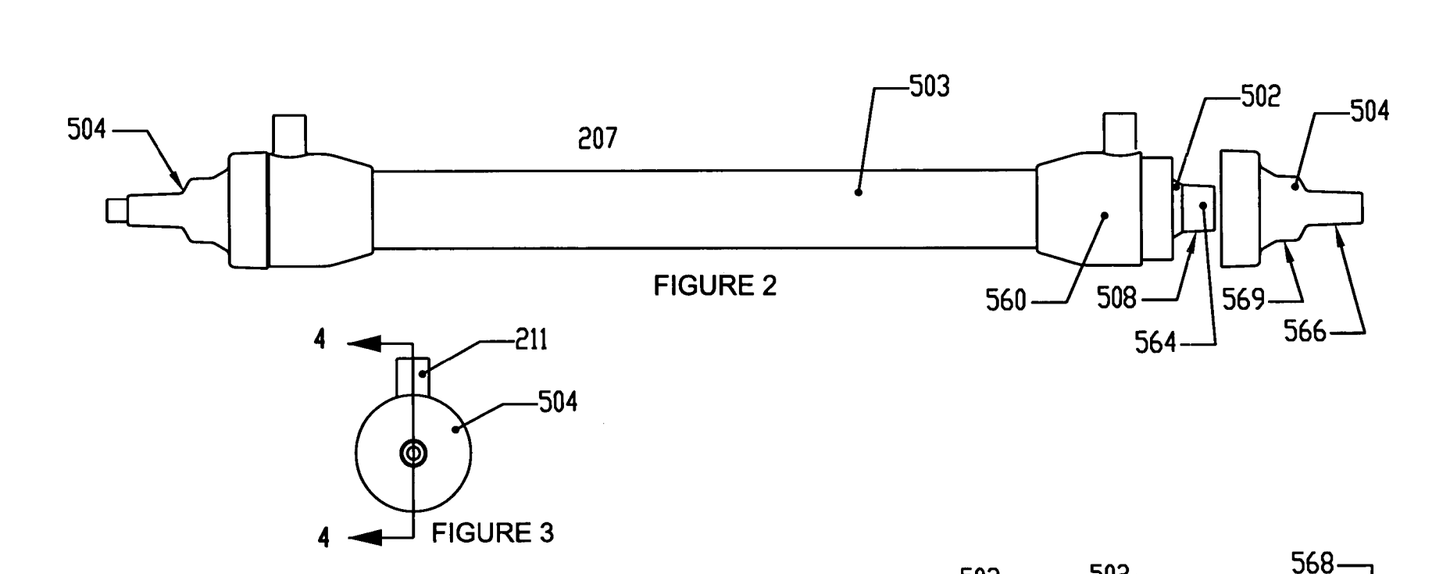
FIG. 2 is side view of a filter with a filter header separately shown at one end of the filter.
FIG. 3 is an end view of the filter.

FIG. 1 illustrates an extracorporeal circuit having a filter 207 to remove fluid from extracorporeal blood. The fluid path includes a disposable extracorporeal circuit 202 for a treatment device coupled to a console having a peristaltic blood pump, and a pump display and a microprocessor control unit. Blood is withdrawn from the patient through the withdrawal needle assembly 201. Blood flow is controlled by a roller pump 204. The withdrawal needle assembly is connected to the blood tubing 220 by a pair of matching connectors 230, 232. One connector 230 is part of the withdrawal needle assembly and the mating connector 232 is a part of the blood tubing 220. These connectors can either be an integral part of the connected blood tubing or separate parts glued, welded or mechanically fixated with the tubing.

Blood tubing 220 is typically 2 m (meters) long and is connected to a disposable pressure sensor 203. The opposite end of the pressure sensor 203 is further connected to blood pump tubing 221 that is connected to a disposable pressure sensor 205. Pressure sensor 205 is connected to blood tubing 222 leading to and permanently connected to the inlet of the blood side of the filter 207, e.g., a hemofilter. The outlet of the blood side of the hemofilter is connected to blood tubing 223 that is connected to one side of a disposable pressure sensor 209. The other side of the disposable pressure sensor 209 is connected to the blood tubing 224 that ends with the connector 233. Connector 231 is part of the blood return needle assembly 210.

A filtrate line 212 is connected to the filtrate outlet 211 of the filter 207 on one side and to the filtrate collection bag 215 on the other side. An ultrasonic air detector 206 is in contact with the outer surface of the blood tubing 222 and blood leak detector 213 is in contact with the outer surface of the filtrate tube. Both detectors 206, 213 do not interrupt the smooth flow paths through the interiors of the tubes.

The filter 207 provides a smooth flow path for the blood through the filter passages. The hollow fiber bundle provides a fiber membrane surface area of 0.1 m², which provides sufficient fluid removal during operation of the extracorporeal circuit. The long and thin bundle 501 (FIG. 4) of hollow fiber filters promote a smooth flow path through the filter. The fiber filter bundle 501 may have an effective length of 22.5 cm and a fiber bundle diameter of 1.2 cm.

FIGS. 2 through 5 show the filter 207 comprising a hollow cylindrical tube 503 with end caps 560 at opposite ends of the tube. A long hollow fiber bundle 501 extends the length of the tube. A potting compound 502 seals the ends of the fiber bundle in the end caps 560. Filter header caps 504 slide over the ends of the filter stem 564 and couple the fiber bundles 501 to the tubing of the blood lines 222, 223. Blood enters the filter 207 through a header cap 504 which directs the blood into the open ends 580 of the fibers 501 at the filter cut surface 505. The cut surface 505 has the open ends of fiber 501 each surrounded by potting compound 502.

Figure 4:
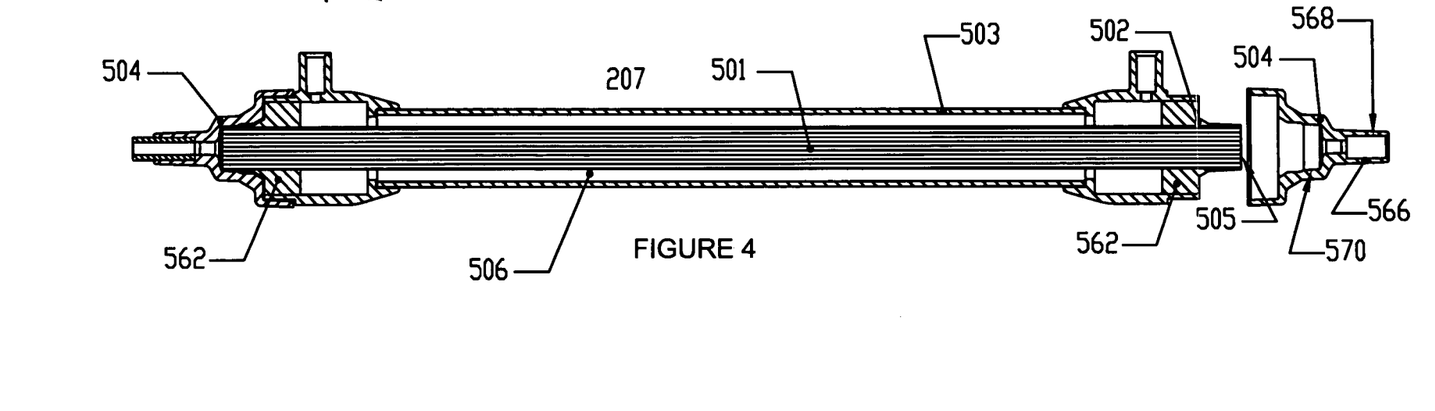
FIG. 4 is a cross-sectional view of the filter taken along line 4-4 of FIG. 3.
Figure 5:
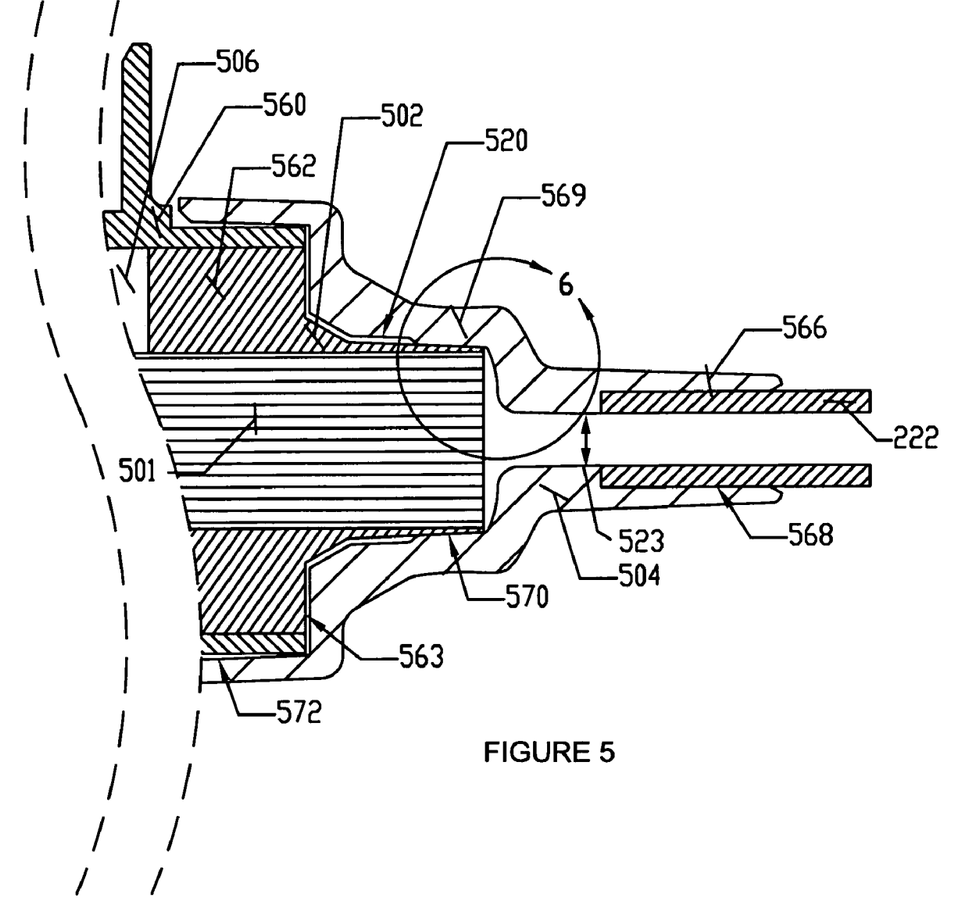

The potting compound provides a mount for the fiber bundle 501 in the filter and prevents blood from traveling around the fiber ends and into the ultrafiltrate compartment 506. The potting compound may be a moldable resin that, when in liquid form, is cast around sections of the fiber bundle at opposite ends of the bundle. The end sections of the fibers are encased in the liquid resin compound. The resin is formed by an annular mold that allows the liquid resin to cure into a disk 562, through which extends the fiber bundle 501. A potted stem 564 of the fiber bundle extends axially outward of the disk 562. Fibers densely populate the entire cross-sectional area of the stem 564, including to a rim proximate the outer perimeter of the stem. After the resin has hardened, the stem is cut to form an end surface 505 of open, hollow fiber ends and resin. The stem 564 is not cut flush with the face 563 of the disk 562, but rather extends axially outward of the disk. The perimeter of the resin disk 562 is seated in the open cylindrical end of the of the filter cap 560. The seal between the resin disk 562 and the cap 560 is removed from the blood flow. The filter header cap has a large diameter end 572 that fits over and seals with the end of the cap 560. Adhesive may be applied to the secure the header end 572 to the filter cap 560.

A narrow rim 514 (FIG. 8) of potting compound (without associated fiber ends) surrounding the ends of the fiber bundle (to the extent such a rim even exists) has a minimal thickness along the stem 564 of the ends of the fiber bundle. The rim 514 of the potting compound forms a thin annulus around the periphery of the blood contacting end surface 505 of the stem 564. The blood contacting end surface 505 of the stem is populated with open fiber ends to allow blood to flow through the entire area of the end surface 505. For a filter with 900 fibers, each with an outside diameter of 280 microns, the cut end surface 505 may have a diameter of 11.43 mm (0.45 inches) with a total surface area of 102.6 mm². Of this total surface area, the exposed potting compound is dispersed among the fiber ends and the potting area is minimized to 47.19 mm² (0.073 inches²), which is less than 50 percent of the total surface area. The width of outer rim 514 of potting compound (which is devoid of fibers) is on average between 0.025 mm to 0.508 mm (0.001 to 0.020 inches). It is believed that the amount of potting area in the end surface 505 has been reduced by 70% as compared to the solid potting compound surface rim area of a conventional fiber design, such as is disclosed in U.S. Pat. No. 4,990,251.

The filter header cap 504 has a conical shape that is preferably formed of a flexible plastic material, such as, 50 to 95 Shore A. The filter header cap includes an small diameter cylindrical end 566 that connects to a blood tube. The blood tube fits into a passage 568 in the end 566 of the header cap that is coaxial with the header cap and filter. The diameter of the passage steps-down at the end of the inserted blood tube, so that the smaller diameter portion of the passage 568 has the same diameter as the blood passage of the blood tube, 222,223.

Figure 6:
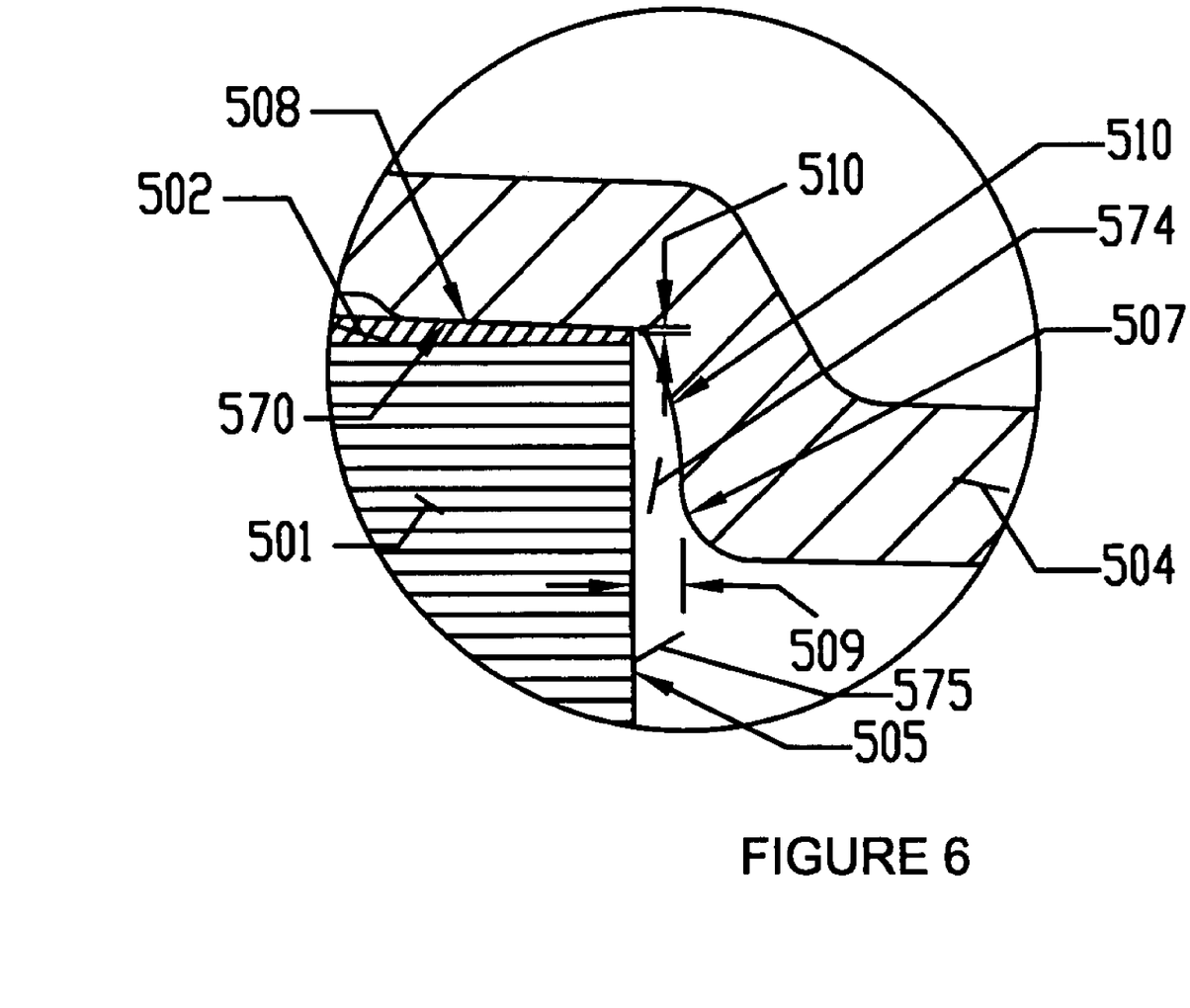

The filter head includes a middle cylindrical section 569 having an inner surface 570 that seals around the outer surface cylindrical surface 508 of the stem 564. The filter head material is soft and flexible to seal on the potted fiber bundle outer circumference 508 of the stem, without distorting, crushing, or occluding the filter fibers particularly on the outside circumference of the cut surface 505. The seal between the filter head middle section 569 and the stem 564 of the fibers is formed by an interference fit between the header cap 504 and a stem 564 (formed of fibers and potting compound) of between 0.025 mm to 1.27 mm (0.001 to 0.050 inches) depending on the actual cap diameter. The interference fit between the filter header cap and the potted fiber bundle establishes the height between the end surface 505 of the fiber bundle and the filter cap header cap 504. The interference fit causes the filter header cap to seal to the circumference of the stem and thereby achieve the desired height between the end 505 of the fiber bundle and the inner surface 510 of the header cap. The header cap does not abut against the potting compound disk 562.

Additionally there may be a relief area 520, either in the cap or potted surface, to receive an adhesive that secures the filter header cap to the stem. Other attachments may be used to secure the filter header cap onto the stem and cap of the filter, such as thermal welding, screw threads, or snap features.

The middle section 569 of the filter header cap forms an interior chamber 574, 575 from the passage 568 to the stem end surface 505 with the open ends of the fibers. The passage 568 may have a diameter 523 that expands slightly, e.g., 5 degrees, as it opens to a corner 507 having a radius of 30 to 70 percent of the inlet diameter 523. The annular corner 507 opens to a center flow zone 575 and to an outer annular flow zone 574 between the inside surface of the header cap 504 and the end surface 505 of the stem. The center zone 575 is aligned with the open end of the aperture 568, and receives blood flowing in a straight stream from the aperture into fibers. The blood flow turns radially outward from the diameter 523 around the corner 507 into the outer annular flow zone 574. The annular corner 507 and the annular inner surface 510 of the filter header cap are shaped to minimize flow eddies as the blood flow turns the corner 507 and passes through the annular flow zone 574. The slope of the inner surface 510 of the header cap may curve smoothly to the outer rim 570 of the stem 564, where the inside surface 510 at its perimeter turns inward at an angle of 30 to 60 degrees towards the stem. The depth 509 of the annular flow zone 574, which is between the end surface 505 of the stem and a tangent point between radius 507 and contour 510 may be 0.381 mm to 1.016 mm (0.015 to 0.040 inches). The depth 509 of the annular flow zone 574 is narrow to eliminate or minimize dead zones in that zone. The ratio of the depth 509 to the diameter of the stem, e.g., 11.43 mm, may be less than 1 (depth) to 10 (diameter of stem).

Figure 15:
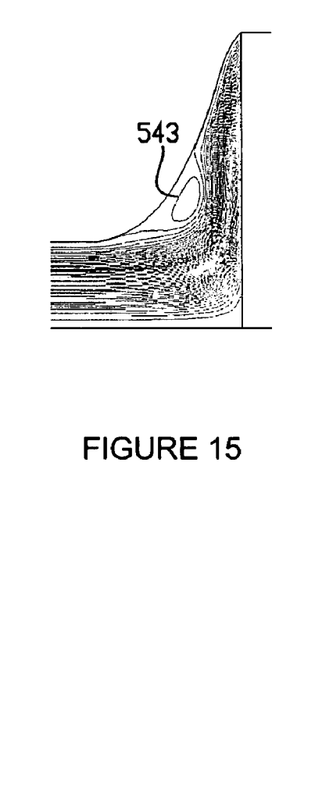
FIGS. 15 and 16 are each side views of proposed filter header designs showing simulations of blood flow stream lines through the headers.
Figure 16:
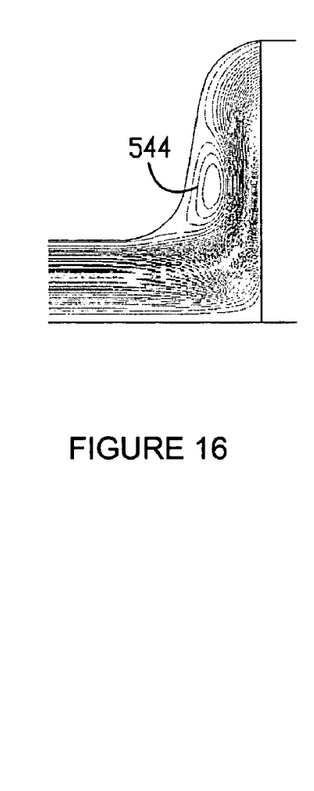

FIG. 15 shows recirculation stream lines 543 caused by an excessive radius in the filter header cap 504. FIG. 16 shows recirculation stream lines 544 in a header caused by an excessive annular flow zone depth.

Figure 7:
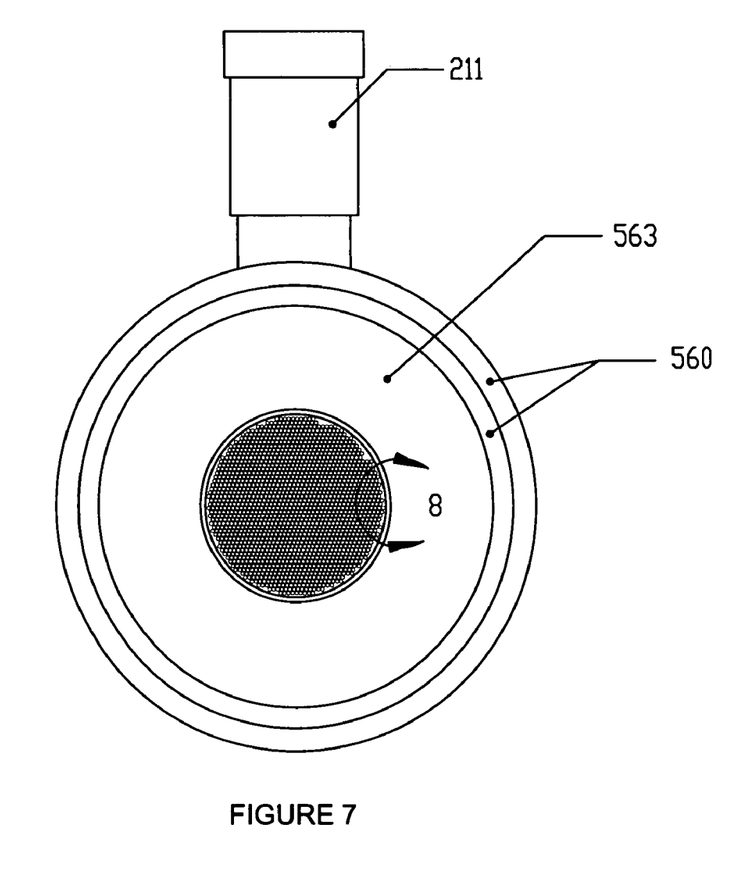
FIG. 7 is an end view of the filter.
Figure 8:
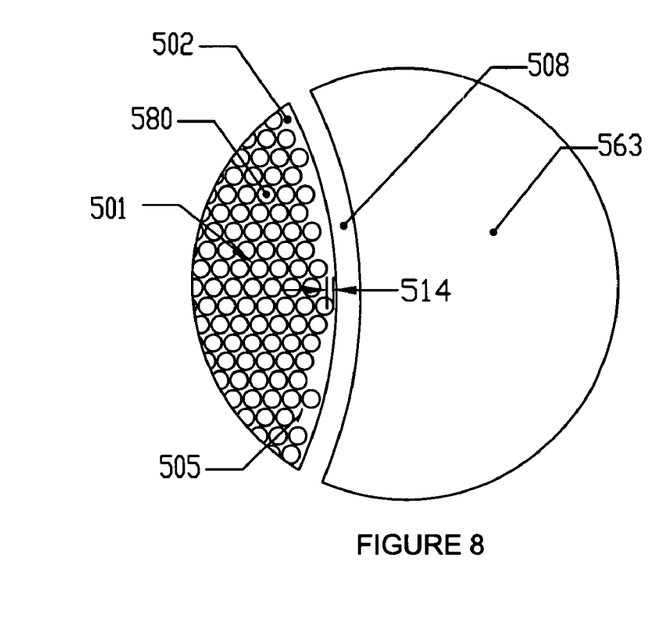
FIG. 8 is an enlarged end view of the filter showing the region 8 of FIG. 7.

FIGS. 7 and 8 are end views of the filter 207, with the filter header cap removed. The cut end 505 of the stem 564 of the fiber bundle 501 is heavily populated with open fiber ends 580. These open ends receive the blood flowing through the header cap 504. The rim 514 of potting compound at the periphery of the stem is narrow and does not establish a substantial dam to the flow of blood into the fibers.

Figure 9:
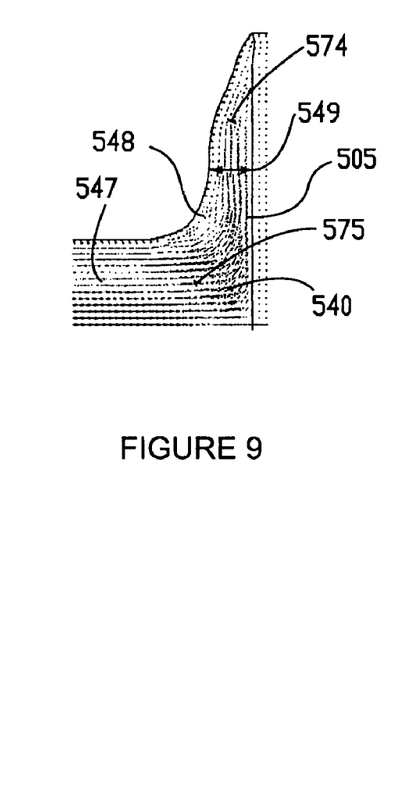
FIG. 9 is a side view of the filter header portion of the filter showing a simulation of blood flow stream lines through the header.
Figure 10:
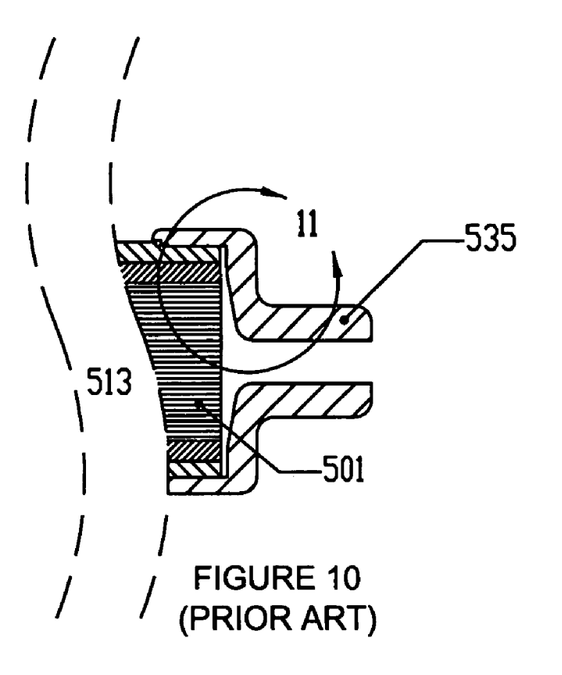
FIGS. 10, 11, 12, and 13 are each cross-sectional side views of conventional filter headers of prior art filters.

FIG. 9 is a side view of a half-section of the filter header cap 504 and fiber bundle showing simulated blood flow lines from the aperture of the header cap and into the ends of the fibers. The blood flows in straight flow lines 547 from the aperture and into the center zone 575 of the end section of the fiber stem, as shown by flow lines 540. Flow stream lines 548 show the blood turning in laminar flow around the corner 507 and into the narrow depth of the annular flow zone 574. As the flow 549 spreads out into the annular flow zone, the blood flows into the ends of the fibers at the end surface 505 of the stem. Dead zones of blood flow do not appear in the stream lines shown in FIG. 9.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims

What is claimed is:

1. A filter for an extracorporeal blood circuit comprising:
a bundle of hollow fibers having an end section encased in a potting material, wherein said end section further comprises a stem of fibers and potting material extending from a disk of the potting material, wherein the stem of fibers and potting material has an outside diameter along an entire length of the stem, and the stem outside diameter is substantially narrower than an outside diameter of the disk of potting material; and
an end surface of the stem includes open ends of the fibers distributed throughout the end surface including open ends proximate to a perimeter of the end surface,
the stem including a stem side surface substantially perpendicular to the end surface of the stem;
a filter housing through which extends said bundle;
a filter housing cap at a first end of the filter housing, wherein the disk of the potting material is sealed to the filter housing cap;
a filter header cap including an inlet connectable to a blood line and an open end, said filter header cap including a cap side surface substantially parallel to the stem side surface, said cap side surface abuts the stem side surface, and at least one of the cap side surface and stem side surface is tapered along the abutment, wherein the filter header cap is sealed to the filter housing cap, and
the filter housing including a second end having an outlet connectable to a blood line,
wherein an inside diameter of the filter housing is substantially greater than an outside diameter of the stem.

2. A filter as in claim 1 wherein the inlet is coaxial with the filter.

3. A filter as in claim 1 wherein the end surface includes a rim area of potting material, wherein the rim area is devoid of the open ends of the fibers and the rim has a width no greater on average than 0.508 mm.

4. A filter as in claim 1 wherein the end surface includes a rim of potting material devoid of the open ends of the fibers and the rim has an average width in a range of 0.025 mm to 0.508 mm.

5. A filter as in claim 1 wherein the end section is an end of a stem of the bundle extending outward from a disk of the potting material.

6. A filter as in claim 5 wherein the disk is fitted into the filter housing cap and the filter housing cap is mounted on a cylindrical tube housing the bundle.

7. A filter as in claim 1 wherein the open end of the filter header cap forms an interference fit on the side of the stem.

8. A filter as in claim 7 wherein a diameter of the stem is greater than an inner circumference of the filter header cap which seals against the stem in a range of 0.025 mm to 1.27 mm.

9. A filter as in claim 1 wherein a gap between the end surface and an opposing interior surface of the filter header cap is within a range of 0.381 mm to 1.016 mm.

10. A filter as in claim 1 wherein a diameter of the end surface is no greater than four times an internal passage diameter of the blood line.

11. A filter as in claim 1 wherein the end surface has exposed potting material covering less than 50 percent of a total surface area of the end surface.

12. A filter as in claim 1 wherein a gap between the end surface and an opposing interior of the filter header cap is less than ten percent of a diameter of the end surface.

13. A filter for an extracorporeal blood circuit comprising:
a bundle of hollow fibers having an end section encased in a potting material, wherein said end section further comprises a stem of fibers and potting material extending from a disk of the potting material, wherein the stem of fibers and potting material has an outside diameter along an entire length of the stem, and the stem outside diameter is substantially narrower than an outside diameter of the disk of potting material;
an end surface of the stem includes open ends of the fibers distributed throughout the end surface including open ends proximate to a perimeter of the end surface,
the stem including a stem side surface substantially transverse to the end surface of the stem;
a filter housing through which extends said bundle;
a filter housing cap at a first end of said filter housing, wherein the disk of the potting material is sealed to the filter housing cap;

a filter header cap including an inlet connectable to a blood line and an open end, said filter head cap including a cap side surface substantially parallel to the stem side surface, said cap side surface abuts the stem side surface, and at least one of the cap side surface and stem side surface is tapered along the abutment, wherein the filter header cap is sealed to the filter housing cap, and the housing including a second end having an outlet connectable to a blood line, wherein the disk is a ring of potting material around the bundle of hollow fibers and substantially devoid of said fibers.

* * * * *